Oct. 27, 1964 P. A. BELLAS 3,154,044
AMPHIBIOUS VEHICLES

Filed March 5, 1962 3 Sheets-Sheet 1

INVENTOR
PAUL A. BELLAS

BY Millman and Jacobs

ATTORNEYS.

Oct. 27, 1964 P. A. BELLAS 3,154,044
AMPHIBIOUS VEHICLES
Filed March 5, 1962 3 Sheets-Sheet 3

INVENTOR
PAUL A. BELLAS
BY
Millman and Jacobs
ATTORNEYS.

United States Patent Office 3,154,044
Patented Oct. 27, 1964

3,154,044
AMPHIBIOUS VEHICLES
Paul A. Bellas, 27 Stewart Ave., Riverside, N.J.
Filed Mar. 5, 1962, Ser. No. 177,319
10 Claims. (Cl. 115—1)

My invention which I herein describe is an invertible amphibious vehicle consisting of two major parts.

It is an object of this invention to provide a new and improved convertible land and water conveyance.

In accordance with an embodiment of my invention, an automobile body section and a hull section are attached by means of hinges or otherwise. Either section is capable of being superimposed, one upon the other depending upon their relative positions.

The body section is placed upon the hull section for marine use, the hull section is placed upon the body section for land use. The hull and body sections have the further capability to be disengaged at hinges or other releasable attaching devices and used independently as a boat or land vehicle.

The foregoing and other objects of the invention as well as the invention itself will be more fully understood from the following description when read together with the accompanying drawing, wherein:

FIGURE 5 is a perspective view showing the vehicle in a closed condition for use as a land conveyance and with the hull section providing coverage for the land section.

Specific reference is now made to the drawing in which similar reference characters are used for corresponding elements throughout.

Figure 1:
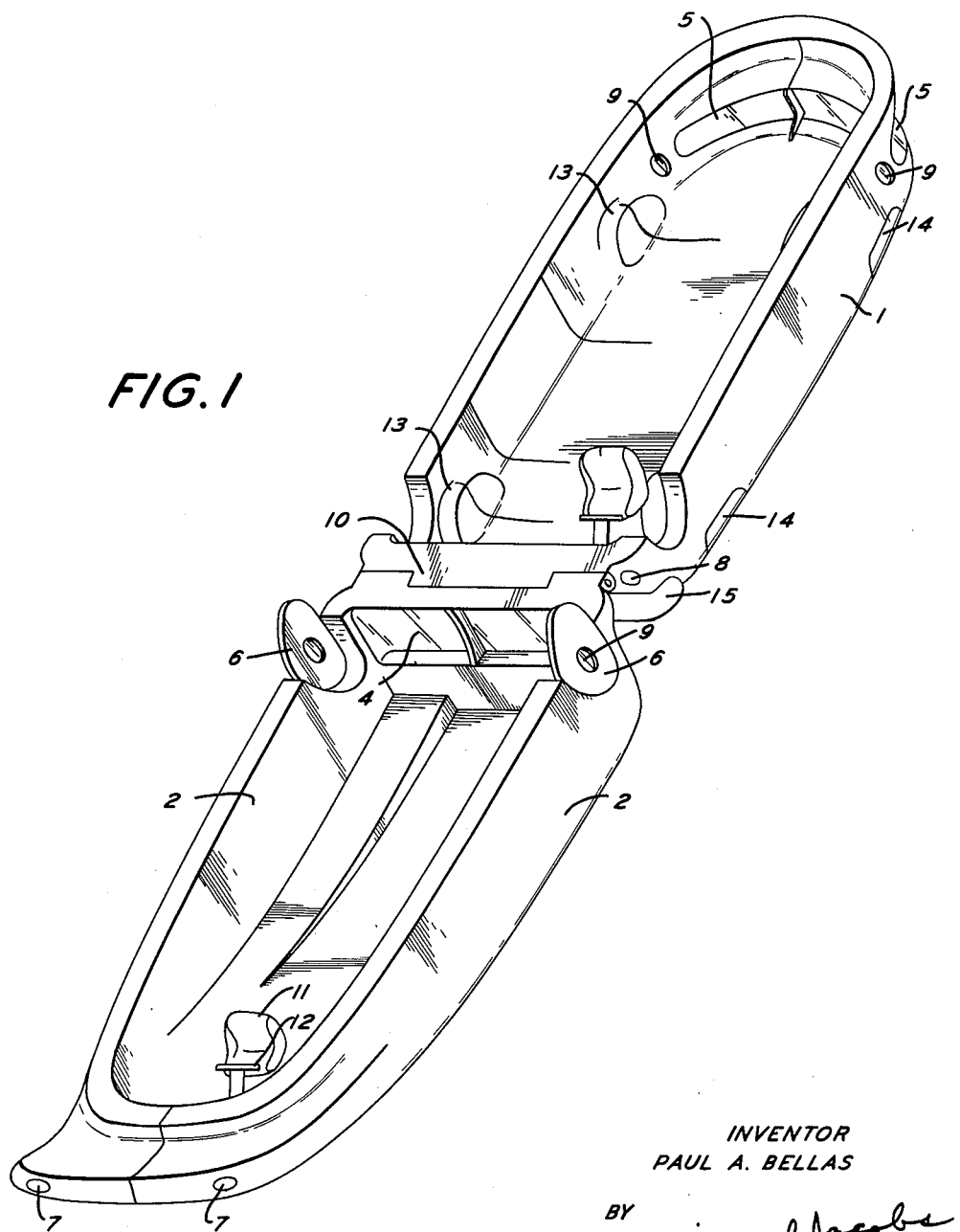
FIGURE 1 is a perspective view of a vehicle embodying this invention with the land section and hull section in an open, extended condition prior to conversion to either land or marine use.
Figure 3:
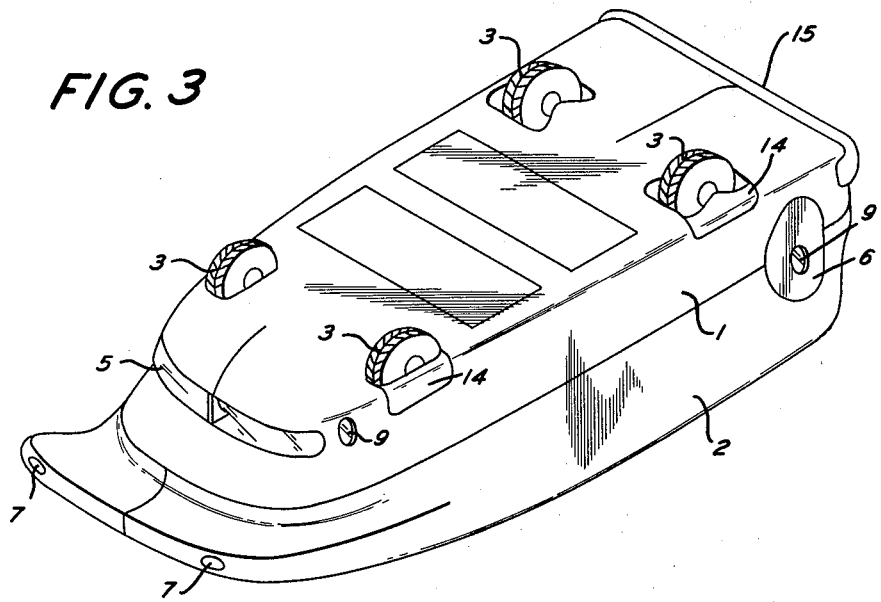
FIGURE 3 is a perspective view of the embodiment of FIGURE 1 of the vehicle with the two major parts, section 1 and section 2, extended prior to conversion, in which the operation of opening and closing takes place from either side.
Figure 4:
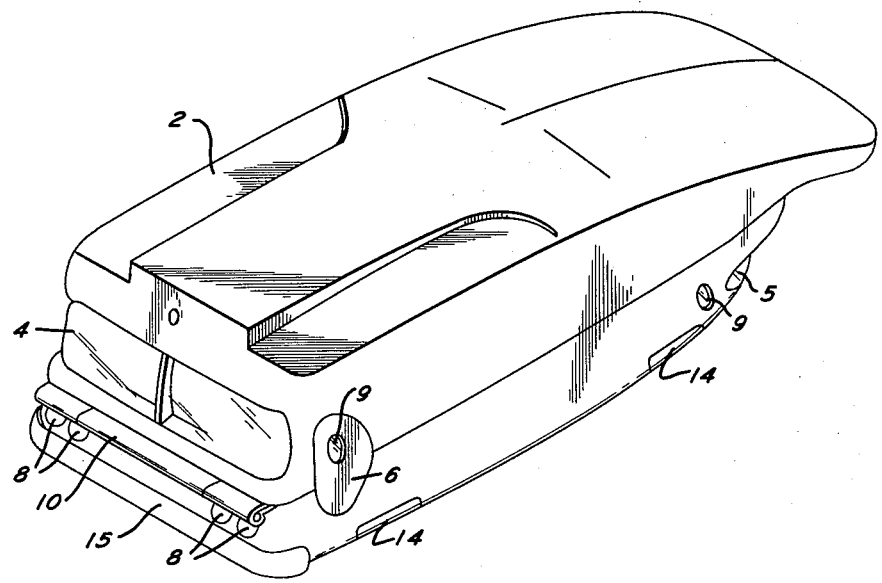
FIGURE 4 is a perspective view of the embodiment of FIGURE 1 showing the vehicle in a closed condition for use as a marine conveyance, and with the land section providing coverage for the hull section.

The invertible amphibious vehicle of the embodiment of FIGURES 1, 3, and 4 is comprised of a land section 1 and a hull section 2. Wheels are mounted on the land section 1 in an appropriate manner to support the vehicle when operated as a land conveyance in the condition illustrated in FIGURE 4.

A windshield 4 is provided in one end of the hull section 2. This windshield is in the stern of the hull section, as shown in FIGURE 1, when the vehicle is operated as a water conveyance. As shown in FIGURE 4, this windshield 4 is located in the front of the vehicle when it is used as a closed land conveyance and is effective as a windshield under this condition.

A windshield 5 is formed in the rear of the land section 1 (as viewed in FIGURE 1) and is part of the body of that land section. When operated as a marine conveyance (as viewed in FIGURE 3), and with the land section 1 forming the roof to the hull section 2, the windshield 5 is effective and in operating position.

Doors 6 are provided on opposite sides of the vehicle. The land section 1 and hull section 2 have complementary openings that together form a doorway into which the door 6 is fitted. In the illustrated embodiments, these doors 6 are located adjacent to the front of the land section 1 and adjacent to the stern of the hull section 2.

Lights 7 are located in the front end or bow of the hull section 2 and function as front lights for the boat. These lights 7 function as rear lights when the vehicle is used as a land conveyance with the hull section in place as a roof enclosing the land section. In a similar fashion, lights 8 located in front of the land section 1 function as front lights when the vehicle is used as a land conveyance and function as the rear lights when used as a marine conveyance with the land section 1 fitted as a roof to the hull section 2. Windows 9 are provided in the doors 6, and also side windows 9 (see FIGURES 1 and 3) are near the windshield 5 of the hull section 2.

Figure 2:
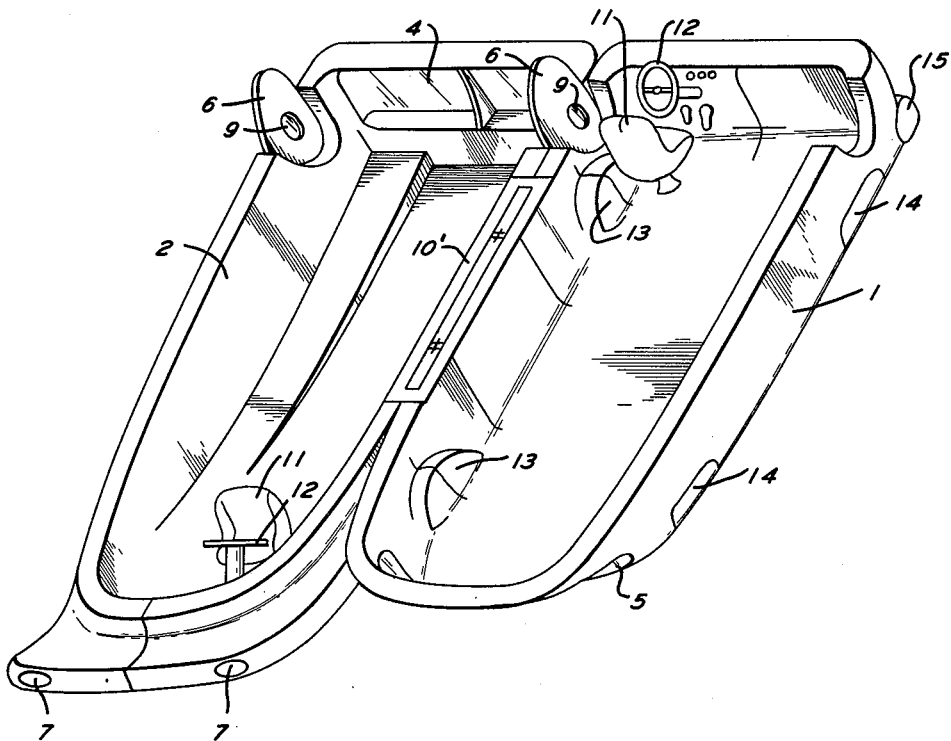
FIGURE 2 is a perspective view of a modified form of the invention with the major parts in an open, extended condition prior to conversion, and in which the operation of opening and closing takes place from either side.

A hinge 10 (shown in FIGURES 1 and 4) is mounted between the front end of the land section 1 and the rear end of the hull section 2. The hinge is appropriately constructed to permit swinging of one section on or off of the other section and to be detachable so that the land section and hull section may be used independently as a land or marine conveyance, as noted above. As shown in FIGURE 2, a hinge 10' is provided to couple the land section 1 and the hull section 2 along their sides instead of at their ends; in other respects, the embodiment of FIGURE 2 is generally the same as that of FIGURE 1 and would have an appearance similar to that shown in FIGURE 3 or FIGURE 4 when used respectively as a closed marine conveyance or closed land conveyance.

A seat 11 and associated steering wheel 12 are provided at the front of the hull section 2 (FIGURES 1 and 2), and a similar seat and steering mechanism 12 are provided at the front of the land section 1 (FIGURES 1 and 2). The body of the land section 1 is formed with wheel well housings 13 into which the wheels 3 are fitted, and wheel well covers 14 are provided. A bumper 15 (FIGURE 4) is provided at the front of the land section 1 below the front lights 8.

Thus, I have provided a convertible land and water conveyance which may be used as a steerable, over the road vehicle. This vehicle has a wheeled body portion enclosing a predetermined seating area and a roof portion for that seating area. The roof portion forms a complete hull of a boat that is readily detachable from the body portion for launching in the water, which boat also has a predetermined seating area. When used as a boat, the body portion of the land section has sides that mate with the sides of the hull portion so that the land section can be mounted as a roof for the boat. Thereby, an enclosed over the road vehicle or boat may be operated, and either section may be separately operated for their respective functions of land vehicle or boat.

A preferred embodiment of the invention is described above and illustrated in the drawing. Variations in the invention without departing from the spirit thereof will be readily apparent to those skilled in the art.

I claim:

1. A convertible land and water conveyance comprising a self-powered, steerable, over the road vehicle having a wheeled body portion enclosing a predetermined seating area, and a rigid roof portion for said seating area, said roof portion comprising a complete hull of a boat that is readily detachable from said body portion for launching in the water, and that has a predetermined seating area, said roof and body portions having complementary door sections.

2. A convertible land and water conveyance as recited in claim 1 wherein said roof portion is detachably hinged to said body portion.

3. A convertible land and water conveyance as recited in claim 2 wherein said roof portion is hinged at one end thereof to one end of said body portion.

4. A convertible land and water conveyance as recited in claim 3 wherein said roof portion is hinged at the stern of said boat hull.

5. A convertible land and water conveyance as recited in claim 4 wherein said vehicle has a windshield for said body portion formed as the stern of said boat.

6. A convertible land and water conveyance as recited in claim 2 wherein said roof portion is hinged at one side thereof to one side of said body portion.

7. A convertible land and water conveyance as recited in claim 1 wherein said roof portion has sides and ends supportable on and mating with the sides and ends of said body portion to form a fully enclosed over the road vehicle.

8. A convertible land and water conveyance as recited in claim 1 wherein the sides and ends of said body portion are supportable on the sides and ends of said roof portion to form a fully enclosed boat.

9. A convertible land and water conveyance comprising a self-powered, steerable, over the road body portion enclosing a predetermined seating area, and the complete hull of a boat enclosing a predetermined seating area, said boat hull and body portion having rigid mating sides for mounting one as a roof on the other and having complementary door sections, and means for detachably securing said one to said other.

10. A convertible land and water conveyance as recited in claim 9 wherein said securing means includes a readily detachable hinge coupling for swinging said one on and off of said other.

References Cited in the file of this patent

UNITED STATES PATENTS

| | | |
|---|---|---|
| 1,455,994 | Cowan | May 22, 1923 |
| 1,560,983 | Gibbs et al. | Nov. 10, 1925 |
| 2,063,627 | Ruf | Dec. 8, 1936 |

FOREIGN PATENTS

| | | |
|---|---|---|
| 1,092,795 | Germany | Nov. 10, 1960 |